US008829435B2

(12) United States Patent
Lasater

(10) Patent No.: US 8,829,435 B2

(45) Date of Patent: Sep. 9, 2014

(54) MOLDABLE CERAMICS FOR MASS SPECTROMETRY APPLICATIONS

(75) Inventor: Matt A. Lasater, Pflugerville, TX (US)

(73) Assignee: Thermo Finnigan LLC, San Jose, CA (US)

(*) Notice: Subject to any disclaimer, the term of this patent is extended or adjusted under 35 U.S.C. 154(b) by 0 days.

(21) Appl. No.: 13/195,758

(22) Filed: Aug. 1, 2011

(65) Prior Publication Data

US 2013/0032710 A1 Feb. 7, 2013

(51) Int. Cl.
*H01J 49/06* (2006.01)
*C03C 10/00* (2006.01)

(52) U.S. Cl.
CPC ........... *C03C 10/0054* (2013.01); *H01J 49/062* (2013.01); *H01J 49/06* (2013.01)
USPC ............................. 250/293; 250/290; 501/52

(58) Field of Classification Search
USPC ............. 250/281, 282, 290, 293, 299; 501/52
See application file for complete search history.

(56) References Cited

U.S. PATENT DOCUMENTS

| | | | | |
|---|---|---|---|---|
| 4,939,106 | A * | 7/1990 | Miyakoshi et al. | 501/32 |
| 5,922,444 | A * | 7/1999 | Tsuzuki et al. | 428/220 |
| 6,441,370 | B1 * | 8/2002 | Khosla et al. | 250/292 |
| 6,528,784 | B1 * | 3/2003 | Tang et al. | 250/282 |
| 2006/0083930 | A1 * | 4/2006 | Sumi et al. | 428/426 |
| 2006/0287184 | A1 * | 12/2006 | Mori et al. | 501/32 |
| 2008/0062049 | A1 * | 3/2008 | Castany et al. | 343/702 |
| 2009/0035538 | A1 * | 2/2009 | Namerikawa et al. | 428/201 |
| 2009/0122506 | A1 * | 5/2009 | Sugimoto et al. | 361/811 |
| 2010/0084547 | A1 * | 4/2010 | Pringle et al. | 250/282 |
| 2010/0301210 | A1 * | 12/2010 | Bertsch et al. | 250/290 |
| 2011/0147584 | A1 * | 6/2011 | Kim et al. | 250/292 |
| 2012/0202675 | A1 * | 8/2012 | Park et al. | 501/32 |

OTHER PUBLICATIONS

Schott Technical Glass Solutions GmbH, "Schott Technical Glasses—Physical and technical properties," brochure from Feb. 2010, pp. 1-44.

* cited by examiner

*Primary Examiner* — Nicole Ippolito
*Assistant Examiner* — David E Smith
(74) *Attorney, Agent, or Firm* — Timothy J. Obara

(57) ABSTRACT

A glass ceramic including an alkali metal earth oxide, e.g. SrO suitable for overmolding a RF component provides a good RF response and good mechanical robustness. Specifically, SrO reduces the flow temperature of the ceramic while maintaining the RF and mechanical performance. The resulting glass formulation contains 10-50 mol % SrO, 5-30 mol % $Al_2O_3$, and 20-60 mol % $B_2O_3$.

7 Claims, 4 Drawing Sheets

RF quality factor for various materials at 250 C and 1.65 MHz

Q

Material Name

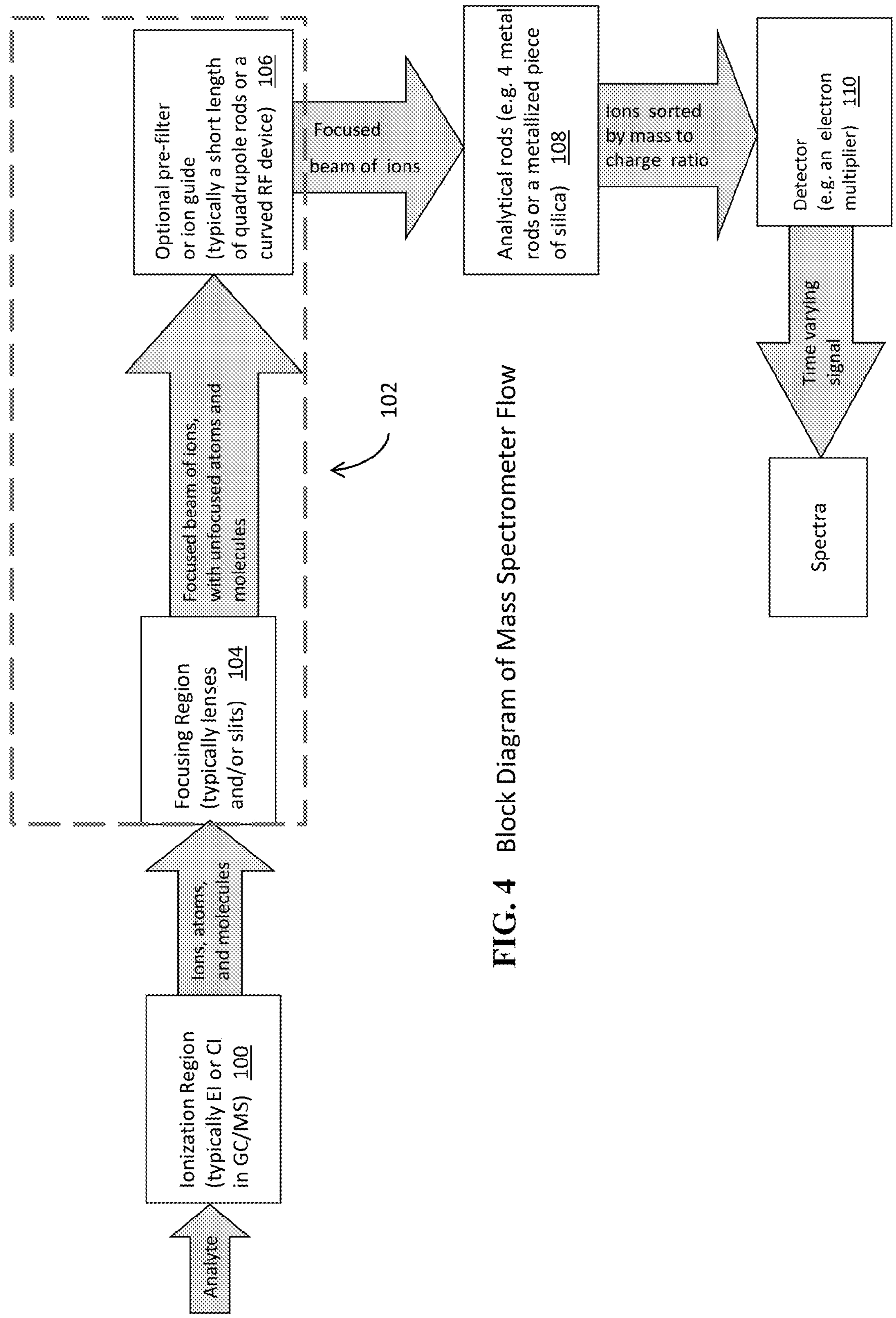
FIG. 4 Block Diagram of Mass Spectrometer Flow

MOLDABLE CERAMICS FOR MASS SPECTROMETRY APPLICATIONS

BACKGROUND

Mass spectrometry (MS) is an analytical technique that measures the mass-to-charge ratio of charged particles. It is used for determining masses of particles, for determining the elemental composition of a sample or molecule, and for elucidating the chemical structures of molecules, such as peptides and other chemical compounds. The MS principle consists of ionizing chemical compounds to generate charged molecules or molecule fragments and measuring their mass-to-charge ratios.

Many mass spectrometers use applied radio frequency (RF) fields to separate the ions based on their mass-to-charge ratio, to trap ions for reaction or future analysis, or to direct the ions to other parts of the instrument. The quadrupole mass analyzer is one type of mass analyzer used in mass spectrometry. Ions are separated in a quadrupole based on the stability of their trajectories in the oscillating electric fields that are applied to the rods. The quadrupole ion guide consists of four parallel rods made of metal or metalized ceramic or glass. Each opposing rod pair is connected together electrically, and a radio frequency (RF) voltage is applied between one pair of rods and the other. A direct current voltage is then superimposed on the RF voltage. Ions travel down the quadrupole ion guide between the rods. Only ions of a certain mass-to-charge ratio m/z will reach the detector for a given ratio of voltages: other ions have unstable trajectories and will collide with the rods. This permits selection of an ion with a particular m/z or allows the operator to scan for a range of m/z-values by continuously varying the applied voltage.

The quadrupole ion trap mass analyzer is another type of mass analyzer used in mass spectrometry. Ions are stored in an RF field where the trajectories of the ions are bounded within the confines of the analyzer. As the RF field is varied, the trajectories of ions with particular m/z values become unstable and the ions are ejected from the trap. This permits the selection of an ion with a particular m/z or allows the operator to scan for a range of m/z-values by continuously varying the applied voltage.

RF only ion guides are commonly used in many mass spectrometers. These guides may be used to separate the ions from neutrals, to cool the ions for later injection into the mass analyzer, or to trap the ions for reaction before injection into the mass analyzer, or to focus the ion beam into the mass analyzer. The guides may be in a variety of configurations, but quadrupole rods, hexapole rods, and octapole rods are commonly used. In all cases, the RF field with no DC component allows ions of all m/z to pass through the device.

The applied RF fields are typically in the range between 500 kHz to 5 MHz. This frequency range requires electrical isolation of metal components as well as low losses of the applied RF in the insulators, particularly at elevated temperatures. These constraints usually restrict the materials to relatively expensive machined parts, e.g. alumina or Vespel. Additionally, Vespel and other organic polymers have softening points that preclude the use of them at temperatures above 250 C. Most organic polymers also will emit chemicals into the vacuum chamber when hot. These chemicals lead to background contamination of the mass analyzer. Inorganic materials, such as alumina and glass typically have softening points greater than 500 C. The moldable ceramic putties can be used, but these parts require a post-molding firing to set the material. This firing can produce oxide formation on the metal component as well as excessive variability in the ceramic shape and size Alternatively, dry moldable ceramic materials, e.g. glass bonded with alumina and a mineral flux such as cryolite, may be used. This is done by overmolding the metal component with molten ceramic. The moldable materials can be lossy in regards to RF but are less expensive to incorporate into a final product because the dry moldable material does not require post-molding operations such as firing or machining.

Formulations of ceramics containing lead oxide are more transparent to RF energy and have lower softening points. The lower the softening point of the ceramic, the easier it is to mold the part. The less RF energy that is absorbed by the ceramic, the less temperature increase is induced in the ceramic. This is helpful because at the temperature of the ceramic increases, the absorption of the RF energy also increases. If the RF absorption is too high, either the part will overheat or the RF generator will not be able to maintain the required field. For mass spectrometry applications that use RF, the lower absorbance of parts containing lead oxide increases the operating temperature range of the part where thermal runaway is prevented. However, materials containing lead are being phased out due to environmental concerns and regulations, e.g. Reduction of Hazardous Materials directive, (RoHS).

There are moldable glass and ceramic formulations available that are RoHS compliant. As shown in FIG. 1, they possess unacceptably high RF losses at elevated temperatures as measured by the quality factor (Q). FIG. 1 also shows the novel materials described in this teaching that are RoHS compliant, have acceptable RF characteristics, and are physically robust, e.g. are mechanically hard and do not dissolve significantly in water.

SUMMARY

A glass formulation including alumina ($Al_2O_3$), boron oxide ($B_2O_3$), and an alkali earth oxide, e.g. strontium oxide (SrO), provides good RF response and good mechanical robustness for mass spectrometry applications. Specifically, SrO reduces the softening temperature while maintaining the required RF and mechanical performance at elevated temperatures. The resulting glass formulation contains 10-50 mol % SrO, 5-30 mol % $Al_2O_3$, and 20-60 mol % $B_2O_3$.

BRIEF DESCRIPTION OF THE DRAWINGS

FIG. 4 illustrates a block diagram for a typical flow of analyte mass spectrometry assembly, e. g. quadrupole mass spectrometer.

DETAILED DESCRIPTION

Figure 1:
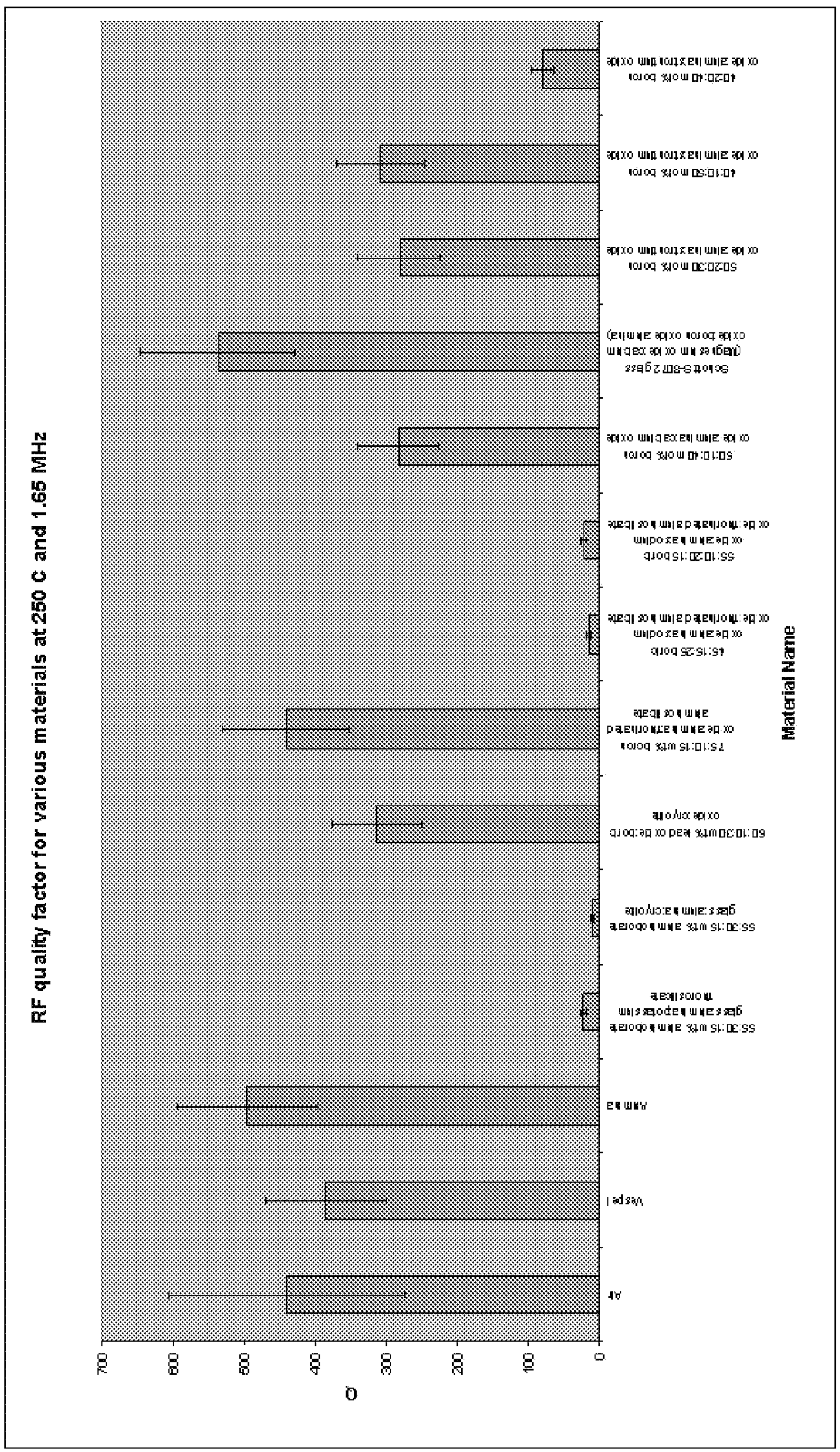
FIG. 1 shows the RF quality factor for various materials at 250 C. and 1.65 MHz.
Figure 2:
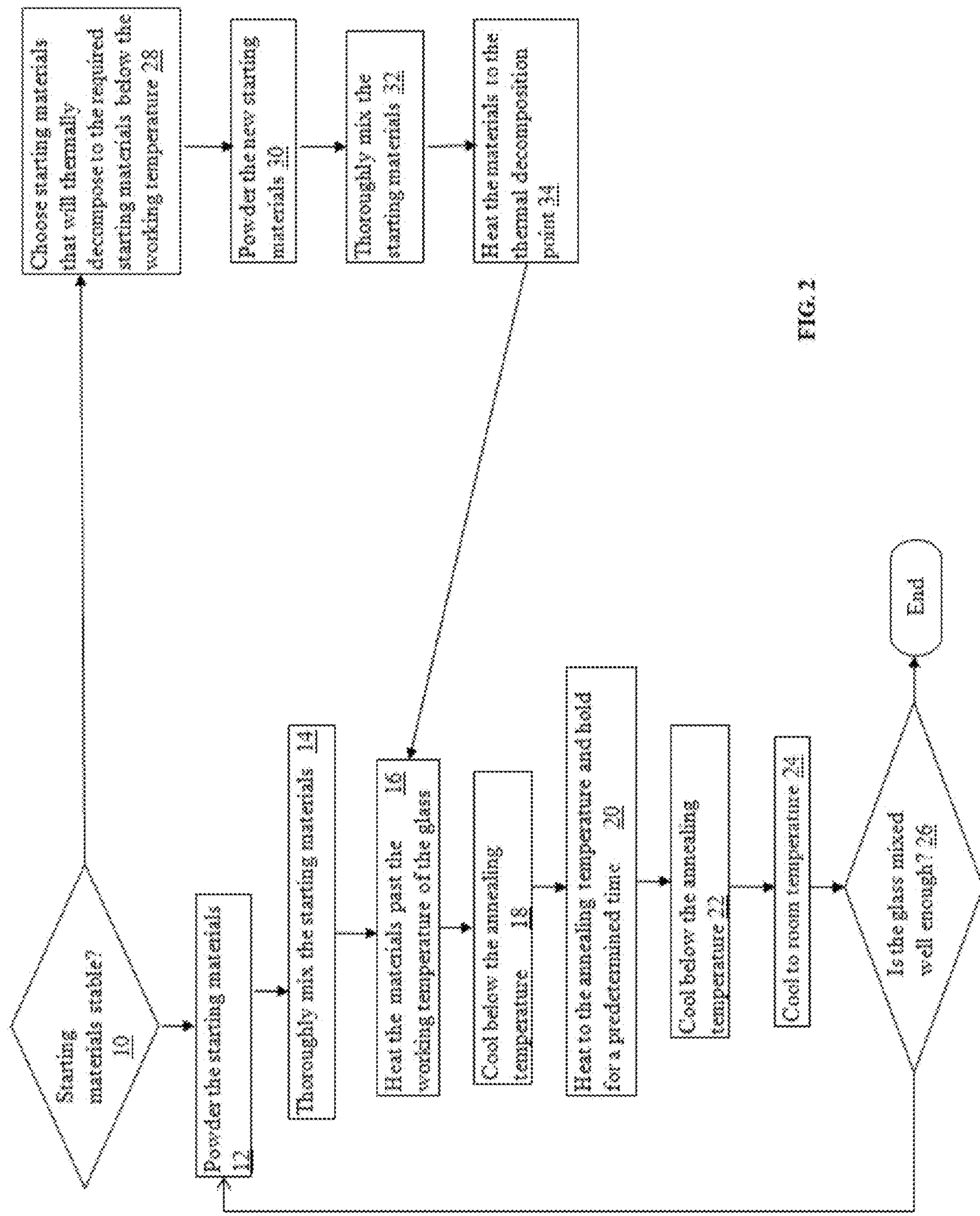
FIG. 2 is a flowchart for manufacturing glass.

FIG. 2 is a flowchart for manufacturing glass.

In step 10, it is determined if the required starting materials are stable. To illustrate, sodium oxide might be required. This material is not stable and is not a suitable starting material. Instead a compound that will thermally decompose to sodium oxide at the glass making temperature, e.g. sodium carbonate or sodium hydroxide, will be used instead. Alternatively, the use of calcium oxide might be called for. This material is stable, commonly available and can be used in the formulation directly.

If yes in step 10, then in step 12, the starting materials are powdered. In step 14, the starting materials are thoroughly mixed. In step 16, the materials are heated past the working temperature of the glass. In step 18, the mixture is cooled below the annealing temperature. In step 20, the mixture is heated to the annealing temperature and held for a predetermined time. This time is based on the thickness of the glass. The entire bulk must reach the annealing temperature. In step 22, the formulation is cooled below the annealing temperature. In step 24, the glass is cooled to room temperature. In step 26, it is determined if the glass is mixed well enough. If yes, stop. If no, return to step 12.

If no in step 10, then in step 28, select starting materials that are thermally stable. In step 30, powder the starting materials. In step 32, thoroughly mix the starting materials. In step 34, heat the materials to the thermal decomposition point. Continue from step 16.

Figure 3:
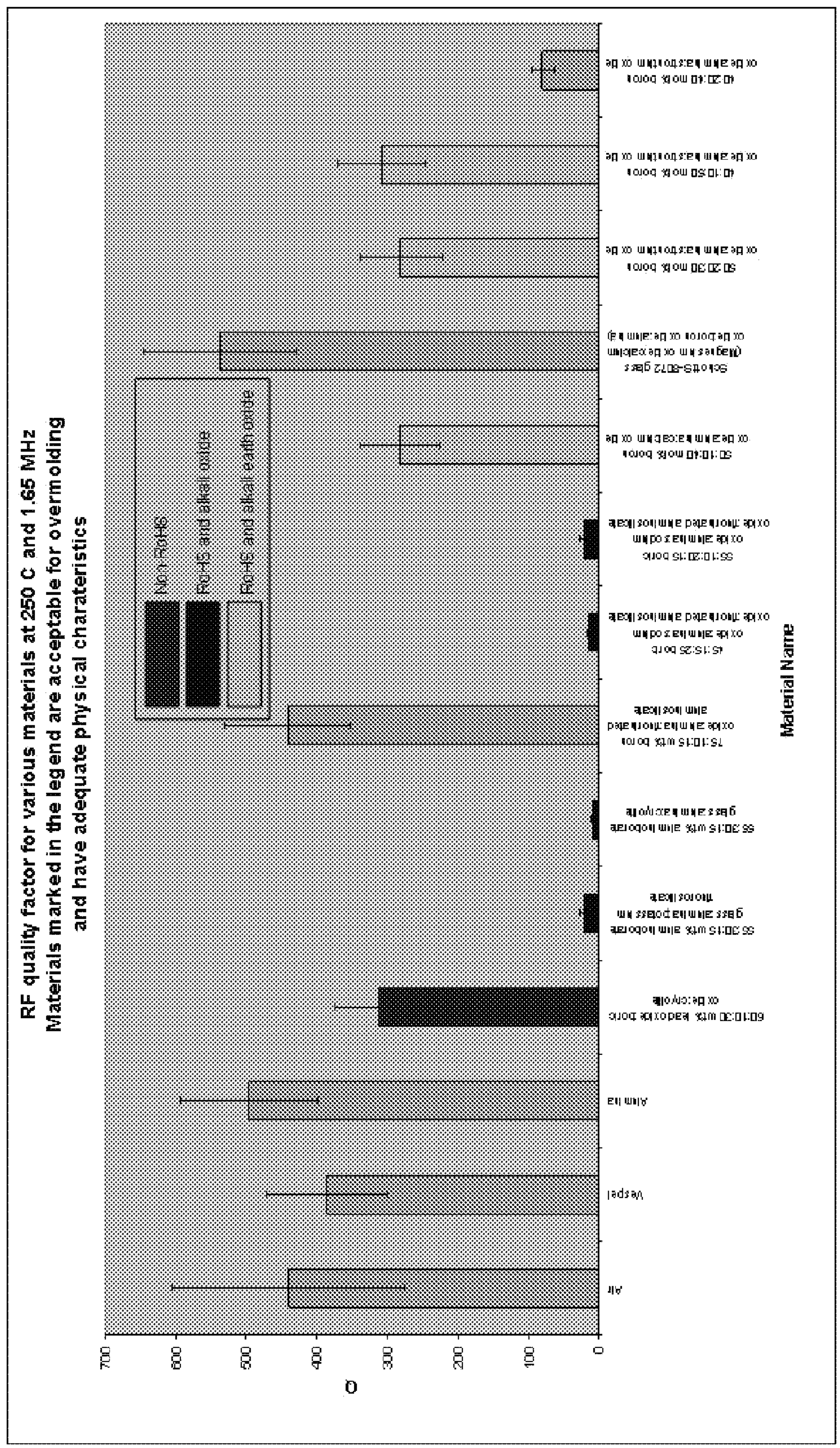
FIG. 3 shows the RF quality factor for various materials. The commercially available RoHS compliant formulations are marked in dark blue, the commercially available non-RoHS complaint material is in red, and the novel formulations are marked in green. The novel formulations use bivalent alkali-earth metal oxides.

In one illustrative embodiment, ceramic formulations were made using monovalent alkali oxides as the flux. The alkali oxides lowered the glass transition point allowing for a moldable ceramic without reflow. Initially, the ceramics had showed a good RF response, e.g. Q value and mechanical robustness. At higher temperatures, the RF response decays and the performance of the material is unacceptable, as shown in FIG. 3.

A simple mold includes two primary components: an injection mold and an ejector mold. The glass enters the mold through a sprue in the injection mold. The sprue bushing seals tightly against the nozzle of the injection barrel of the molding machine and allows molten glass to flow from the barrel into the mold, also known as the cavity. The sprue bushing directs the molten glass to the cavity images through channels that are machined into the faces of the A and B plate. These channels allow the material to run along them, e.g. runners. The molten glass/ceramic mixture flows through the runner and enters one or more specialized gates and into the cavity geometry to form the desired part.

The amount of molten glass required to fill the sprue, runner, and cavities of the mold is a shot. Trapped air in the mold can escape through air vents that are ground into the parting line of the mold. If the air remains trapped, it is compressed by the pressure of the incoming material and is squeezed into the corners of the cavity, where it prevents filling and causes other defects as well. To allow removal of the molded part from the mold, the mold features must not overhang one another in the direction that the mold opens, unless parts of the mold are designed to move from between such overhangs when the mold opens.

In a preferred embodiment, an overmolding process is used mold glass or ceramic around a metal part. As metal and glass have differing rates of thermal expansion, the metal part must be specially prepared to prevent the metal insert from shrinking and pulling away from the glass upon cooling. The surface of the metal part is roughened by the introducing undercuts, bead blasting, etching, grinding, or sanding. The rough surface improves the metal-glass adhesion. For mass spectrometry applications, the metal needs to be free of any insulating oxide layers and the metal must be able to withstand the temperatures of the mold. Generally, a variety of stainless steel is used. Stainless steel can be polished to remove any oxide coating after the molding process. The steel also has a melting point much higher than the melting point of the ceramic material. Aluminum and its alloys may not tolerate the heat of the mold and will form an oxide layer upon exposure to air.

Alternatively, the metal part is coated with an enamel coating. The enamel coating is an interface that bonds well to the metal and also fuses with the glass. The enamel may be applied in multiple coats to a clean metal surface. Because the enamel is a thin coat, the additional RF losses introduced by using an enamel coating that is not made of the material described in this document will not be significant. If thick enamel coats are desired, then the RF losses will become more significant. It is possible to use multiple precision enamel coatings to construct an arbitrary glass shape over metal electrodes. Obviously, if the entire section of glass was made up of many enamel firings, then the enamel used must not absorb an excessive amount of RF energy. This multilayer enamelling technique would require the application and firing of many enamel surfaces. This process would also require some post processing to ensure the metal electrodes were clean and the glass was the correct size and shape.

FIG. 3 shows the Q values for the materials tested below.

During experimentation, it was discovered that adding alkali metal ions, e.g. sodium or potassium ions, increased absorption of the RF energy. It is therefore important to make sure the components in the ceramic minimize the amount of alkali metal ions. In the embodiments of the glass described here, the alkali metal content was always less than 5 mol %. The commonly used, non lead containing fluxes, such as cryolite or fluorinated silicates, contain alkali metal ions. Thus, the use of these types of fluxes should be avoided. However, boron oxide is also used as a flux. The higher the proportion of boron oxide, the lower the softening point of the glass. However, the physical strength of the material decreases with increasing boron content. The solubility of the glass in water also increases with increasing boron content. The glass described here uses boron oxide as RoHS compliant flux A commercially available sample from Schott Glass containing magnesium oxide and calcium oxide and <5 mol % alkali metal oxides had good RF performance, but the softening temperature is over 700 C. This temperature is difficult to accommodate in the molding process because a steel mold will anneal and deform at these temperatures. A typical mold is made of steel and is held at approximately 250 C. The runners will be pressurized to move the glass into the mold as quickly as possible to minimize heat loss from the glass to the mold. As glass cools, the viscosity increases. If the glass cools below the softening point, the pressures required to move the glass along the runners are excessive. Through experimentation, it was noted that the larger the ionic size of the alkali-earth ion, the lower the softening point of the resultant glass. As a result, the preferred embodiment of the glass uses strontium oxide instead of calcium oxide or magnesium oxide. Beryllium oxide is expected to raise the softening point, which is undesirable, and is also toxic as a dust. Barium oxide should lower the softening point further, but is also toxic.

The resulting glass formulation contains strontium oxide (SrO) for a low softening temperature with boron oxide ($B_2O_3$) as a flux and as part of the glass matrix. Alumina ($Al_2O_3$) is also used for strength and solubility resistance. This restricts the glass formation to contain 10-50 mol % SrO, 5-30 mol % $Al_2O_3$, and 20-60 mol % $B_2O_3$. The proportion of alkali oxides, e.g. sodium oxide or potassium oxide, is less than 5 mol %. This glass would be broadly classified as a boroaluminate glass.

FIG. 4 illustrates a block diagram for a typical flow of analyte mass spectrometry assembly, e.g. quadrupole mass spectrometer. The mass spectrometer comprises an ionization region 100, e.g. ion source, that generates and supplies ions to be analyzed to a focusing region 102, e.g. set of ion optics 104. The focusing region 102 may further include an optional ion guide 106 that is used to send the ions to the mass analyzer. The ion guide is typically a short length of quadrupole rods or a curved RF device. Ion optics 104 may be located adjacent to the optional ion guide 106 so that mass spectra may be taken, under the direction of the controller.

A mass analyzer 108 receives the focused beam of ions. A typical quadrupole mass analyzer 108 includes 4 metal rods or a metalized piece of silica. The ions emerge sorted by mass to charge ratio. At the output, a detector 110, e.g. an electron multiplier, detects the sorted ions. A controller (not shown) converts the detected signal into spectra.

The mass spectrometer, as a whole, is operated under the direction of the controller. The mass spectrometer is generally located within a vacuum chamber provided with one or more pumps to evacuate its interior.

The focusing region, e.g. ion optics, may include the glass formulation described above. The glass material can be used anywhere an insulator is required. On sections of the ion optics where an RF field is applied, the glass material is even more advantageous. Overmolding the metal part with glass eliminates the need for modifying the physical shape of the part, as compared with multiple layers of enamel, the creation of specialized discrete insulators, or the use of wet molded and fired parts. The overmolded material does require the use of metal inserts that can withstand the temperatures of the glass. Aluminum is not a suitable material because it melts at a low temperature (660 C.) and softens at its annealing temperature of 425 C. The chemistry of aluminum guarantees that a surface exposed even briefly to air will have a thin layer of non-conductive oxide on the surface. Stainless steel is resistant to oxidation by air even at the mold temperatures requires, which are typically 250 C. Stainless steel can also be polished to remove any oxide coating that does form, is commonly available, and has well defined techniques for machining. For these reasons, stainless steel is the preferred metal for use in glass overmolding. Other metals may also be used that do not soften and can have a surface free of non-conducting oxides.

In addition to the ion optics, the overmolded glass technique can be used anywhere that RF fields need to be applied. Specifically, in a quadrupole mass spectrometer, within the mass analyzer 108, the main analytical rods themselves are held in a specific orientation. This orientation is typically defined by an alignment piece or through vacuum molding the rod material. This material could be used to mold the rods into a monolithic, pre-aligned piece. A set of monolithic, ceramic rods could also be made. Additionally, other high temperature RF systems can be found in other analytical instrumentation, e.g. inductively coupled plasma systems. Other mass spectrometers can also benefit from overmolding metal components that need to fit precisely together for proper operation.

I claim:

1. A device comprising:

a RF component; and a ceramic, overmolding the RF component, the ceramic having an alkali oxide content of less than 5 mol % wherein the ceramic has a glass formation that contains 10-50 mol % SrO, 5-30 mol % $Al_2O_3$, and 20-60 mol % $B_2O_3$, and wherein the ceramic does not require post-molded firing or post-molded machining.

2. The device of claim 1, in which the RF component is stainless steel.

3. A mass spectrometer comprising:

ion source providing ions;

a focusing region having ion optics, receiving the ions and providing a focused beam of ions;

a mass analyzer, receiving the focused beam of ions and providing a sorted beam of ions; and a detector, receiving the sorted beam of ions and generating a time varying signal;

wherein one of the focusing region and the mass analyzer includes, at least one RF component, and a ceramic, overmolding the RF component, the ceramic having an alkali oxide content of less than 5 mol % wherein the ceramic has a glass formation that contains 10-50 mol % SrO, 5-30 mol % $Al_2O_3$, and 20-60 mol % $B_2O_3$, and wherein the ceramic does not require post-molded firing or post-molded machining.

4. A mass spectrometer, as in claim 3, wherein:

the focusing region includes the at least one RF component; and the at least one RF component is ion optics.

5. A mass spectrometer, as in claim 4, the focusing region further including an ion guide.

6. A mass spectrometer, as in claim 3, wherein:

the mass analyzer includes the at least one RF component; and the at least one RF component is a plurality of rods.

7. The mass spectrometer of claim 3, in which the at least one RF component is stainless steel.

* * * * *